Patented Aug. 1, 1933

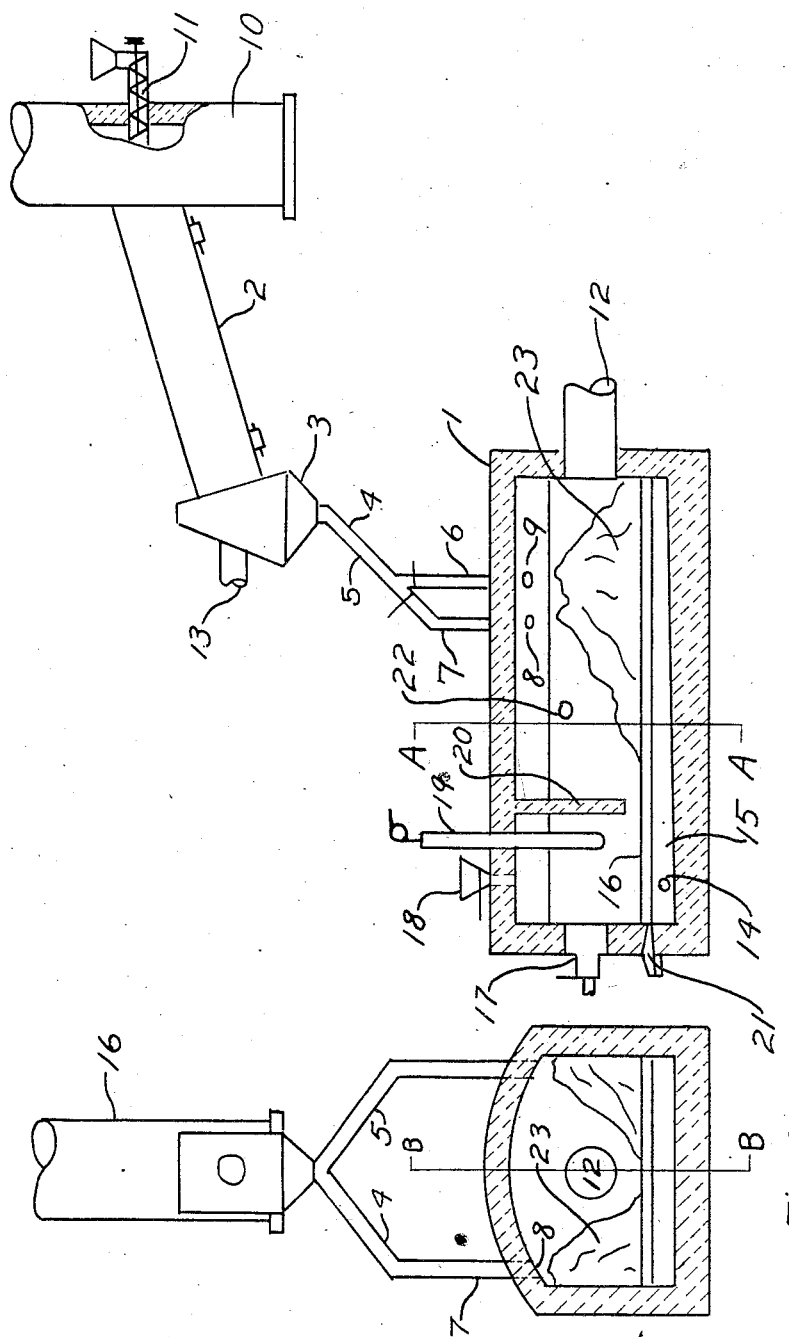

1,920,379

UNITED STATES PATENT OFFICE 1,920,379

PRODUCING AND MELTING SPONGE IRON

Albert E. Greene, Medina, Wash.

Application July 17, 1931, Serial No. 551,410, and in Canada June 18, 1925

7 Claims. (Cl. 75—14)

An application has been filed in Canada June 18, 1925.

My present invention relates to metallurgical process for the reduction of ore and particularly to a combined treatment in which sponge iron is first produced and then collected in molten form.

This application contains subject matter in common with my applications for patent, Serial No. 726,541 filed July 17, 1924 (United States Patent No. 1,819,238), and Serial No. 34,041 filed June 1, 1925 (United States Patent No. 1,819,239).

The object of my present invention is the production of molten iron or other metal by first reducing the oxide in the presence of carbonaceous material at temperatures below the sintering temperature, and then while hot and in the presence of carbonaceous material, passing the reduced sponge iron into a hearth furnace and collecting the reduced iron in a bath beneath a slag containing iron oxide, whereby the excess carbonaceous material is separated and prevented from carbonizing the reduced iron.

Heretofore, prior to the date of my invention, sponge iron was produced by heating a mixture of crushed iron ore and solid carbonaceous material to a reducing temperature below the sintering temperature of the ore. This was done in a rotary furnace and in other types of furnace. An excess of carbonaceous material was used. The hot product was then cooled and the remaining carbonaceous material subsequently separated. This process has not proved commercial, as far as is known. It has a number of disadvantages, among which are the difficulty of preventing reoxidation of the fine iron and the difficulty of separating the excess carbon. Even after separation, it has not proved practicable to liquefy the sponge iron thus produced, except by the process of my present invention.

I have discovered a simple method of obtaining molten reduced iron from sponge iron which avoids the difficulties just mentioned. I have found that I can produce sponge iron by the above described process and that the hot reduced iron mixed with carbonaceous material can be finished by passing this hot mixture into a hearth furnace on a bath of molten slag which contains oxide of iron. The iron can then be collected beneath the slag while the carbonaceous matter can be kept above the metal and thus separated. I can in this way also remove any carbon which may have been taken up by the reduced sponge iron, the iron oxide of the slag combining with it.

The process of my present invention may be carried out in any suitable apparatus, such for example, as a rotary kiln for producing the reduced "sponge iron", together with a melting furnace, such as a furnace provided with electric heating means. However, the process of the invention may be carried out in other apparatus. Thus, the preliminary reduction may take place in any kind of suitable furnace such as a roaster type furnace, and the product may be liquefied in a reverberatory type furnace using combustion heating. The preferred type of apparatus is that shown in the annexed drawing, comprising a rotary kiln for reduction and an elongated electrically heated melting furnace equipped also for combustion heating.

In the drawing,

Fig. 1 is a sectional elevation view showing a melting furnace and a reducing furnace above the melting furnace, connecting with the latter through discharge pipes which convey materials from the rotary furnace into the melting furnace. This apparatus is a combination of my invention and may be employed for carrying out the process of this invention; and Fig. 2 is a sectional elevation taken substantially along the line A—A of Fig. 1.

A brief description of this apparatus will aid in understanding the operations to be subsequently described herein. The melting chamber shown in section in Fig. 1 is a reverberatory chamber having a hearth which slopes to the tap hole end of the chamber. The section is taken through the line B—B of Fig. 2. The refractory material is indicated at 1. The rotary kiln type furnace is indicated at 2. It has a feed head 3, into which the material from the rotary furnace is discharged, and from which it passes, through the pipes 4 and 5, into the melting chamber. Each pipe may be further provided with additional sections, as at 6 and 7. Closing means or valves are also provided to control the flow of material into the melting furnace. These pipes open into the melting chamber at locations 8 and 9 and corresponding openings in the other side of the roof. A screw conveyor 11 serves to feed charge into the upper end of the rotary furnace through the stack 10. A flue 12 is provided in the end of the melting chamber for exit of gas, and a pipe 13 into the feed head serves for entrance of gas and air for heating the rotary furnace. In the lower end of the melting chamber hearth is a tap hole for metal at 14. Metal is indicated at 15 and slag at 16, and a slag tap spout at 21. A burner is indicated diagrammatically at 17 for heating this chamber by combustion, and an opening at 22 is provided for the controlled admission of air for combustion in the flue end of the melting chamber. A charge opening and entrance for material is indicated at 18. An electrode 19 is shown for electric heating of the furnace, and other electrodes may be provided in line with this one for heating the slag end of the chamber or elsewhere for heating the whole chamber electrically. I have shown a refractory wall 20 which may be provided in this chamber to separate the electric heating chamber from the remainder of the furnace.

I will now describe the operation of my process of this present invention for the reduction of iron ore. The production of sponge iron or finely reduced iron made without melting either the reduced iron or the charge material is accomplished by preparing a charge of fine iron ore and carbonaceous material such as coal, the proportion of the latter being sufficient that some remains unconsumed after the operation in the first reducing chamber is completed. Depending on the grade and nature of the carbonaceous material, the exact amount in the charge is determined with a view to having this material present at the end of the rotary kiln operation. The amount may be as much as equal parts of ore and carbonaceous material although usually much less carbon will serve. This charge is fed into the upper end of the rotary kiln through the screw feed mechanism 11. The rotary kiln is heated by combustion. Reducing gas may be admitted together with air, or air alone may be admitted to partly burn the carbonaceous material of the charge. The temperature is regulated so as not to form clinker or fuse the charge material, and ample time is allowed to permit reduction to the desired extent. The rotary kiln is set at a slight angle such as will give the material the necessary time within the kiln in moving from entrance to exit end, and the speed of rotation is further controlled with this end in view. It is understood that the angle of the rotary kiln is only illustrated diagrammatically in this drawing. The reduction of oxide of iron takes place at elevated temperatures approximating those at which sintering takes place and at temperatures below this down to about 500° C. The rotary kiln discharges into the feed head 3 and from here the product from the rotary kiln is passed down through the pipes shown into the melting furnace. The product from the rotary kiln contains reduced iron in small particles together with carbonaceous material and the remaining unreduced material of the ore originally charged. This product is passed into the melting furnace on the molten slag covered bath. Here it is heated in a pile which gradually diminishes except as it is replenished by further entering charge from the rotary furnace. The charge on the slag is heated gradually and the reduced iron passes down through the slag and then into the molten bath beneath. The excess of carbon is retained on the slag and may be oxidized by the admission of air and/or by reaction with the oxide of iron in the slag, but it is necessary to maintain a small percentage of oxide of iron in the slag in order to counteract or remove any carbon taken up by the reduced iron during the previous treatment. Thus, my process provides for dropping the hot reduced iron and other material on a slag bath containing iron oxide which will react with carbon present. This oxide content of the slag may be provided either by addition of iron oxide to the slag or by otherwise maintaining conditions in the chamber which cause the oxide to form in limited amount. I may add a portion of oxide of iron with the charge which enters from the sponge furnace.

The action which results is the collection of the carbonaceous material on the molten slag and the passage down through that slag of the reduced sponge iron. The oxide of iron in the slag serves to decarbonize the reduced iron and the result is the formation of low carbon iron beneath the slag. It is possible to control this reaction so as to obtain a smaller or a greater percentage of carbon in the reduced and liquefied iron beneath the slag, and this may be done by maintaining a greater or a smaller amount of oxide of iron in the slag. The actual percentage may be within the limits between a few percent and as much as twenty-five percent of iron oxide in the slag. The excess carbonaceous material entering with the sponge iron can be utilized in the melting furnace to provide heat by admission of air. However, I do not limit my method to either an electric or any other kind of melting furnace.

What I claim is:

1. The method of producing molten iron from iron oxide material which comprises reducing the iron oxide at a temperature below the sintering point of the material in the presence of an excess of carbonaceous material, passing the resulting product containing reduced iron together with carbonaceous matter and unreduced material into a melting furnace, and collecting the reduced metal in molten condition beneath a slag containing oxide of iron in sufficient quantity to prevent the remaining carbonaceous material from entering the molten metal beneath.

2. The method of producing iron from iron oxide ore which comprises reducing the iron oxide by means of carbonaceous material in a reducing chamber at a temperature below the fusion point of the ore, passing the product from this furnace while hot and while retaining solid carbonaceous material in excess into a melting chamber on a molten slag bath, melting the reduced iron on the slag in the presence of iron oxide to form particles which pass down into and through the molten slag, and collecting the molten iron beneath the slag.

3. The method of producing iron from iron oxide ore which comprises reducing the oxide of iron at a relatively low temperature below the sintering temperature of the ore, using solid carbonaceous material in excess of the amount required to reduce the oxide, and without cooling the product or separating the excess carbonaceous material, passing the charge onto a molten bath covered with slag containing oxide of iron and there melting the reduced iron and collecting it beneath the oxide slag without permitting the excess carbon to carbonize the metal beneath the slag.

4. The method of reducing and melting iron which consists in treating an iron oxide ore with carbonaceous material in excess of the amount needed for reduction to reduce the oxide without melting it, and then passing the hot material containing reduced iron, unreduced earthy material and carbon into a melting chamber and there causing the reduced iron to pass down through a slag containing oxide of iron but preventing carbon from passing through this slag.

5. The method of treating oxide of iron to reduce it which consists in first producing sponge iron by reducing the iron oxide material with carbonaceous material in a reducing chamber below the fusion temperature of the material treated, and then while hot and while retaining an excess of carbonaceous material present, passing the product of the sponge-iron producing furnace into a melting chamber on a bath covered with an iron oxide containing slag and there melting the previously reduced sponge iron and causing the reduced iron to pass down through said oxide slag and collect beneath it, and oxidizing the remaining carbonaceous material on said slag.

6. The method of producing molten iron which consists in first producing sponge iron in a reducing chamber without fusion of the material therein and while retaining this product hot and in the presence of solid carbonaceous material to prevent reoxidation, passing it into a melting chamber onto a bath covered with a slag containing oxide of iron, melting the reduced iron and collecting it beneath the slag, and oxidizing the remaining carbon by means of oxide in the slag and combustion above it.

7. The method of producing liquefied iron which method comprises first producing sponge iron in the presence of an excess of carbonaceous material, passing the resulting sponge iron and remaining carbonaceous material into a melting furnace on a molten slag bath, maintaining iron oxide in the slag while melting the sponge iron and collecting low carbon iron molten beneath said slag.

ALBERT E. GREENE.